E. HARRIS.
Sieve for Fanning-Mills.
No. 227,625.                    Patented May 18, 1880.
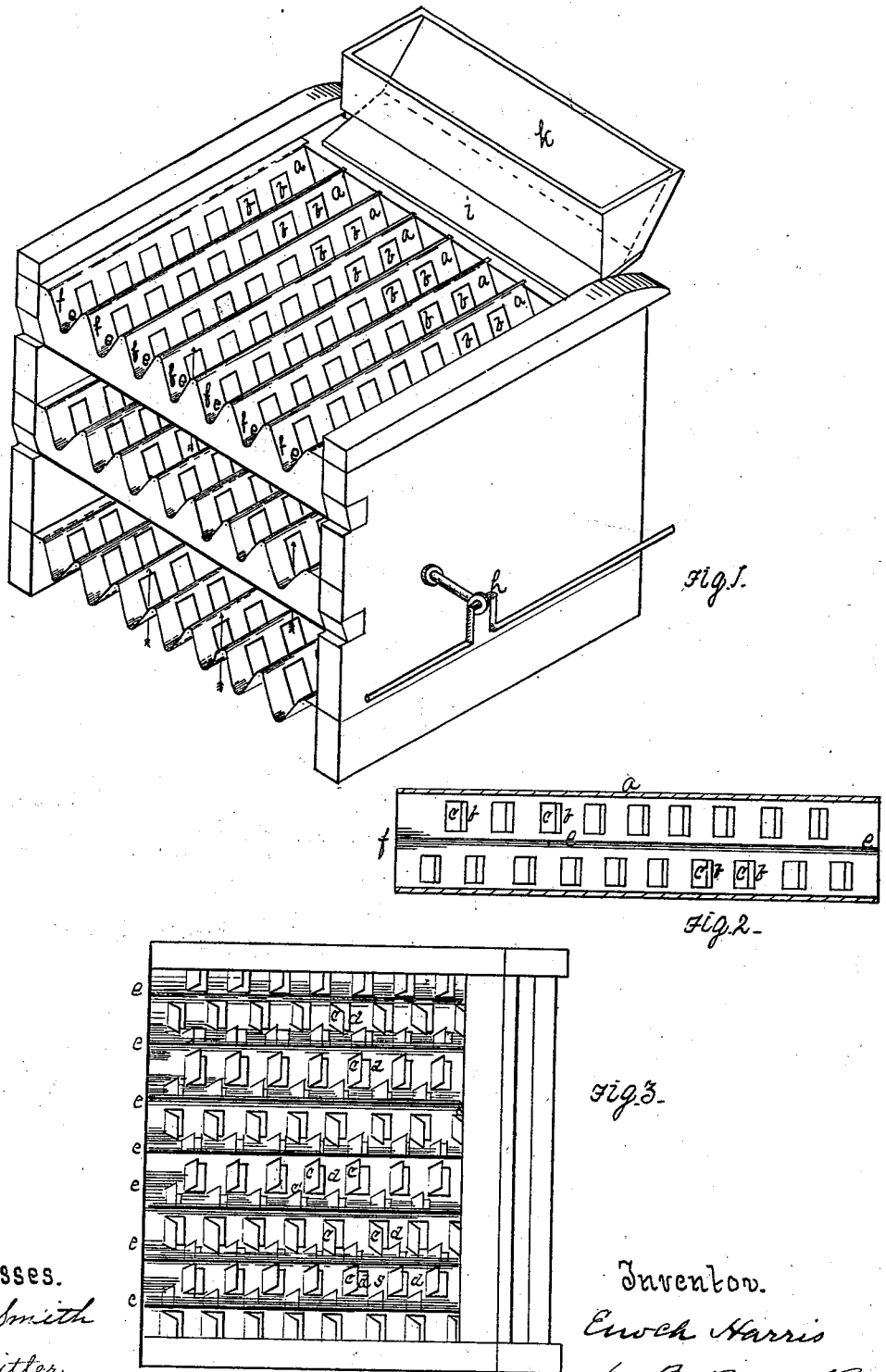

UNITED STATES PATENT OFFICE.

ENOCH HARRIS, OF NORTH LA CROSSE, WISCONSIN.

SIEVE FOR FANNING-MILLS.

SPECIFICATION forming part of Letters Patent No. 227,625, dated May 18, 1880.

Application filed February 13, 1880.

*To all whom it may concern:*

Be it known that I, ENOCH HARRIS, of North La Crosse, in the county of La Crosse and State of Wisconsin, have invented a new and useful Improvement in Sieves for Fanning-Mills; and I do hereby declare the following to be a full, clear, and exact description thereof, reference being had to the accompanying drawings, forming a part of this specification, in which—

Figure 1 is a perspective view of several sieves mounted in a frame and illustrating their operation in a machine. Fig. 2 is a top view of one of the channels of my improved sieve, and Fig. 3 is a bottom view of my improved sieve.

Like letters of reference indicate like parts in each.

It is customary in some places, where wheat is liable to be damaged by the ravages of the chinch-bug, to sow oats with it, for the purpose of protecting it, as oats are obnoxious to the bug and it will not attack either oats or wheat sown with oats. The removal of the oats from the wheat, and especially from spring wheat, the grains of which are light, is a difficult thing to accomplish.

The object of my invention is to obtain a separation of the oats from the wheat which shall be as nearly as possible perfect; and it consists of a sieve with deep longitudinal grooves or corrugations, the bottom of which forms gutters or channels for carrying off the oats, and the sides of which are provided with holes or slots, the cut portion at each hole being unsevered at its lower side and turned outward to form a lip, which extends backward diagonally across or in front of the opening.

To enable others skilled in the art to make and use my invention, I will describe its construction and operation.

The sieve *a* is made of any suitable material, but preferably of sheet-zinc. The holes *b* are first formed in parallel rows by slitting the sheet on three sides and turning out the portion *c* thus cut until it stands diagonally backward across or in front of the hole. The unsevered side *c'*, when the sieve is placed in its inclined position in the mill, is the farthest down the incline. It will be noticed that the holes *c* in one row are opposite to the solid parts *d* in the adjacent rows. The sheet of zinc is then bent to form the deep grooves or corrugations *f*, having the gutters or channels *e* at their bottoms, below the holes *c*.

The holes *c* are made narrow, so that oats, being long and light grains, will not readily go through them as they pass over the sieve; at the same time they are sufficiently wide for the passage of the shorter and heavier wheat-grain.

The sieves *a* may be used in any kind of a fanning-mill.

Fig. 1 is an illustration of three sieves placed in a rectangular frame, *g*, such as is used in one form of fanning-mills. The frame *g*, being in the machine, has a lateral-shake motion imparted to it—that is, a shake-motion at right angles to the run of the grain—by suitable machinery—as, for instance, by the crank *h*.

The blast ascends through the sieve, as shown by the arrows.

The operation is as follows: The grain falls on the board *i* from the hopper *k*, and thence passes down onto the top sieve. The oats, being long and light, fall into and slide down the channels *e*. In order to go through the holes *b* they must turn over endwise through the holes and fall backward against the direction of the run of the grain in the channels and against the blast, which comes up through the holes and is sufficiently strong to retard or entirely prevent the light grain from passing backward and downward through the holes. On the other hand, the shorter heavier wheat-grains, being worked up the sides of the channel by the lateral shake, fall readily through the openings. The oats pass down the channels *e* and over the end into a suitable receptacle, while the wheat passes directly through the sieves.

The position of the lips *c* not only aids in preventing the passage of the oats through the sieves, but directs the blast so as to cast back the lighter grains onto the sieve again. The lip acts as a deflector to turn the oats back into the channel again.

The lip *c*, being connected at the lower side of the holes *b*, gives a smooth surface, which causes the long grains, which cannot turn easily, to be guided or deflected back into the channels again. There is no exposed edge upon which the end of the grain can catch and be turned over into the slot.

This form of perforation or opening is a very superior one for flat sieves for taking oats out of wheat, by reason of its shape and the effect of the lip in directing the passage of the long light oat-grains and in directing the blast.

I find by practical use of my invention that it effects a perfect, or almost perfect, separation of oats from wheat.

What I claim as my invention, and desire to secure by Letters Patent, is—

1. A sieve having corrugations or depressions and narrow lateral perforations or openings, with a lip or flap unsevered from the body at one side and extending diagonally out and back across or in front of each perforation or opening, substantially as and for the purposes set forth.

2. A sieve having a series of deep corrugations, narrow openings in the sides of the corrugations having a lip extending from one side diagonally across or in front of each opening, and shallow channels or gutters in the bottom of corrugations and below the openings, substantially as and for the purposes described.

In testimony whereof I, the said ENOCH HARRIS, have hereunto set my hand.

ENOCH HARRIS.

Witnesses:
H. DANCHERTSEN,
C. L. LIEN.